US008607344B1

(12) United States Patent
Libenzi et al.

(10) Patent No.: US 8,607,344 B1
(45) Date of Patent: Dec. 10, 2013

(54) SYSTEM, METHOD, AND COMPUTER PROGRAM PRODUCT FOR INITIATING A SECURITY ACTION AT AN INTERMEDIATE LAYER COUPLED BETWEEN A LIBRARY AND AN APPLICATION

(75) Inventors: Davide Libenzi, Hillsboro, OR (US); Katsuaki Yoshizawa, Hillsboro, OR (US); Akira Ogata, Tokyo (JP); Victor Kouznetsov, Portland, OR (US); Michael C. Pak, Portland, OR (US); Koichi Asano, Yokosuksa (JP); Kensaku Mori, Yokohama (JP)

(73) Assignees: McAfee, Inc., Santa Clara, CA (US); NTT DoCoMo, Inc., Tokyo (JP)

( * ) Notice: Subject to any disclaimer, the term of this patent is extended or adjusted under 35 U.S.C. 154(b) by 889 days.

(21) Appl. No.: 12/179,342

(22) Filed: Jul. 24, 2008

(51) Int. Cl.
*G06F 21/00* (2013.01)

(52) U.S. Cl.
USPC .................................... 726/23; 726/17

(58) Field of Classification Search
USPC ....................................... 726/17, 23
See application file for complete search history.

(56) References Cited

U.S. PATENT DOCUMENTS

| | | | | |
|---|---|---|---|---|
| 5,925,126 A | * | 7/1999 | Hsieh | 726/19 |
| 6,687,762 B1 | * | 2/2004 | Van Gaasbeck et al. | 719/319 |
| 6,970,697 B2 | | 11/2005 | Kouznetsov et al. | 455/418 |
| 6,973,577 B1 | * | 12/2005 | Kouznetsov | 726/25 |
| 6,987,963 B2 | | 1/2006 | Kouznetsov et al. | 455/414.1 |
| 7,530,106 B1 | * | 5/2009 | Zaitsev et al. | 726/24 |
| 7,587,724 B2 | * | 9/2009 | Yeap | 719/328 |
| 7,640,586 B1 | * | 12/2009 | Johnson et al. | 726/24 |
| 7,895,407 B2 | * | 2/2011 | Dankel et al. | 711/170 |
| 7,953,846 B1 | * | 5/2011 | Amoroso et al. | 709/224 |
| 7,992,156 B1 | * | 8/2011 | Wang | 719/328 |
| 8,042,178 B1 | * | 10/2011 | Fisher et al. | 726/22 |
| 8,079,019 B2 | * | 12/2011 | Lindo et al. | 717/129 |
| 2002/0172363 A1 | * | 11/2002 | Dierks et al. | 380/259 |
| 2002/0178271 A1 | * | 11/2002 | Graham et al. | 709/229 |
| 2003/0177178 A1 | * | 9/2003 | Jones et al. | 709/203 |
| 2004/0003276 A1 | * | 1/2004 | Kouznetsov et al. | 713/200 |
| 2004/0006706 A1 | * | 1/2004 | Erlingsson | 713/200 |
| 2004/0025165 A1 | * | 2/2004 | Desoli et al. | 719/310 |
| 2004/0153709 A1 | * | 8/2004 | Burton-Krahn | 714/4 |
| 2005/0108562 A1 | * | 5/2005 | Khazan et al. | 713/200 |
| 2005/0216762 A1 | * | 9/2005 | Peikari | 713/200 |
| 2006/0026687 A1 | * | 2/2006 | Peikari | 726/24 |
| 2007/0094667 A1 | * | 4/2007 | Bissett et al. | 718/104 |
| 2007/0294312 A1 | * | 12/2007 | Seshadri et al. | 707/200 |
| 2008/0040800 A1 | * | 2/2008 | Park | 726/22 |
| 2009/0100520 A1 | * | 4/2009 | Reasor et al. | 726/23 |
| 2010/0132024 A1 | * | 5/2010 | Ben-Natan et al. | 726/9 |

* cited by examiner

*Primary Examiner* — Michael Pyzocha
(74) *Attorney, Agent, or Firm* — Wong, Cabello, Lutsch, Rutherford & Brucculeri, LLP

(57) ABSTRACT

A system, method, and computer program product are provided for initiating a security action at an intermediate layer coupled between a library and an application. In use, a library of data is stored. Additionally, system calls intended for operating on the data are produced, utilizing an application. Furthermore, the system calls are intercepted and a security action is initiated on the data in response to the interception, utilizing an intermediate layer between the library and the application.

17 Claims, 9 Drawing Sheets

SYSTEM, METHOD, AND COMPUTER PROGRAM PRODUCT FOR INITIATING A SECURITY ACTION AT AN INTERMEDIATE LAYER COUPLED BETWEEN A LIBRARY AND AN APPLICATION

FIELD OF THE INVENTION

The present invention relates to security systems, and more particularly to security systems utilized for securing applications.

BACKGROUND

Traditionally, security systems have been utilized for detecting unwanted data (e.g. malware, etc.). Oftentimes, such security systems are utilized with respect to applications for detecting unwanted data associated with the applications. However, techniques employed by traditional security systems for detecting unwanted data associated with applications have generally exhibited various limitations. Just by way of example, traditional security systems have customarily been detached from the applications being secured, thereby requiring code within the applications to be modified at the time of development of such applications to link to the security systems There is thus a need for addressing these and/or other issues associated with the prior art.

SUMMARY

A system, method, and computer program product are provided for initiating a security action at an intermediate layer coupled between a library and an application. In use, a library of data is stored. Additionally, system calls intended for operating on the data are produced, utilizing an application. Furthermore, the system calls are intercepted and a security action is initiated on the data in response to the interception, utilizing an intermediate layer between the library and the application.

DETAILED DESCRIPTION

Figure 1:
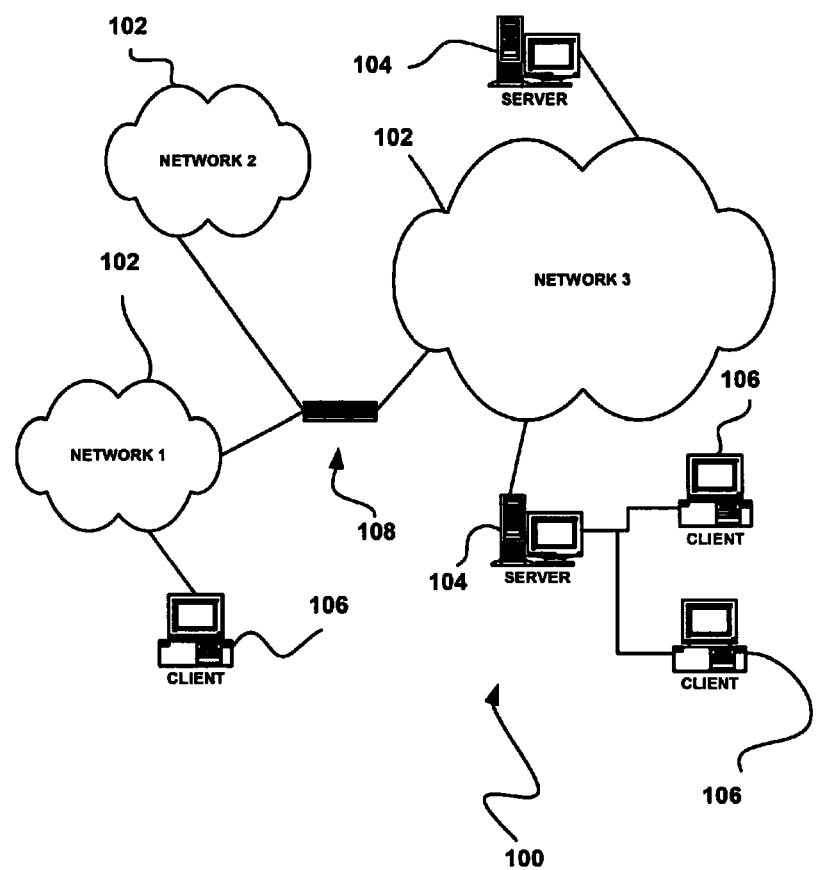
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
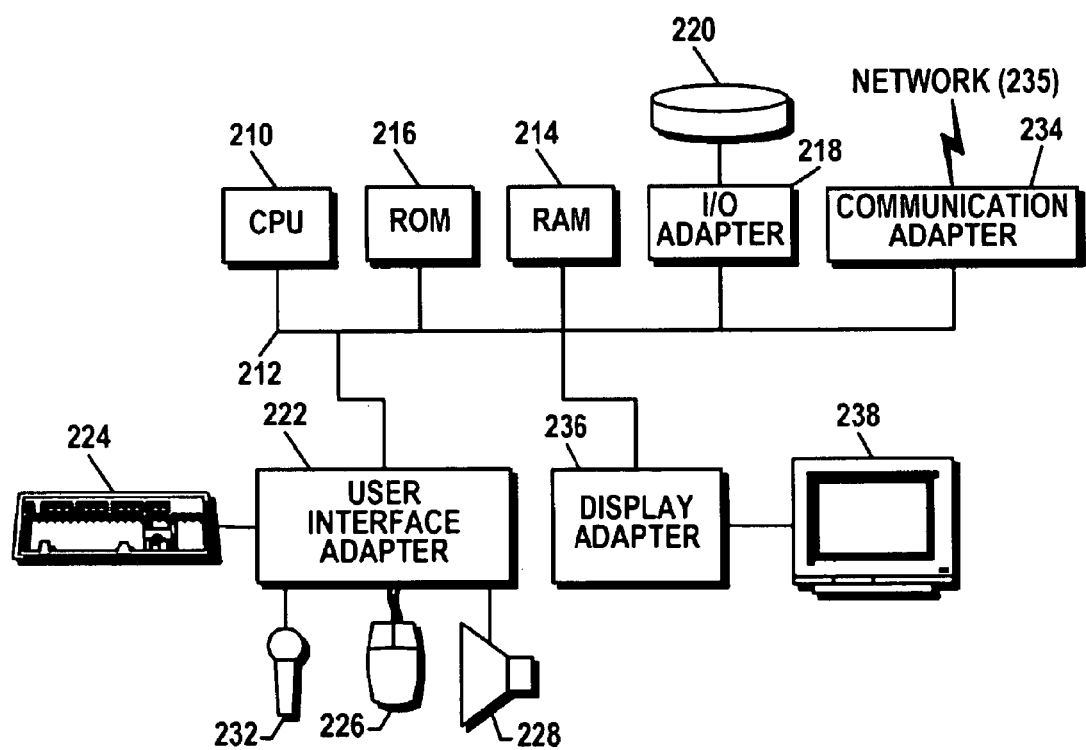
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
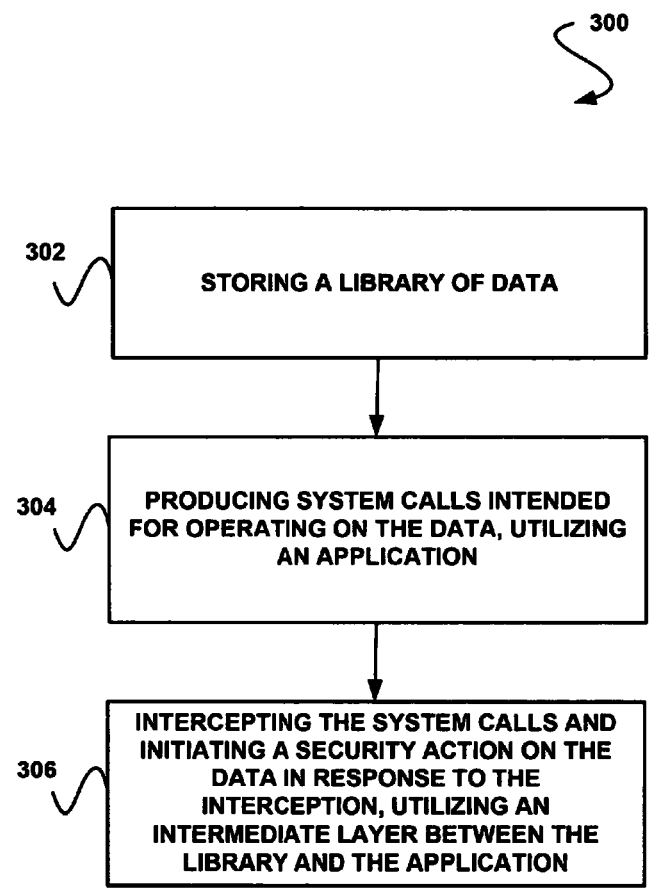
FIG. 3 shows a method for initiating a security action at an intermediate layer coupled between a library and an application, in accordance with one embodiment.

FIG. 3 shows a method 300 for initiating a security action at an intermediate layer coupled between a library and an application, in accordance with one embodiment. As an option, the method 300 may be carried out in the context of the architecture and environment of FIG. 1 and/or 2. Of course, however, the method 300 may be carried out in any desired environment.

As shown in operation 302, a library of data is stored. In the context of the present description, the library of data may include any repository of data. For example, in one embodiment, the library of data may include a system library. In another embodiment, the library of data may store files. In yet another embodiment, the library of data may include a registry (e.g. operating system registry, etc.). In still yet another embodiment, the library of data may store application program interfaces (APIs). Further, it should be noted that the library of data may be stored in any desired type of memory.

Additionally, as shown in operation 304, system calls intended for operating on the data are produced, utilizing an application. In one embodiment, the system calls may include input/output (I/O) calls. For example, the system calls may include open file, close file, read file, write file, read registry, write registry, copy file, rename file, move file, etc. Of course, however, each of the system calls may include any call (e.g. to a function, etc.) utilized for performing an operation on at least a portion of the data.

As an option, the system calls may be produced utilizing the application by initiating the system calls via the application. In one embodiment, the application may produce the system calls for performing operations the data, such as reads of the data, writes to the data, etc. Just by way of example, the application may include code which performs the system calls. In this way, execution of the application may result in producing the system calls.

It should be noted that the application may include a software program and/or any other code capable of producing system calls intended for operating on the data. For example, the application may include a browser application, an electronic mail application, a Java™ application, a phone (e.g. mobile phone) application, etc.

Furthermore, the system calls are intercepted and a security action is initiated on the data in response to the interception, utilizing an intermediate layer between the library and the application. Note operation 306. In one embodiment, the system calls may be intercepted by directing the system calls to the intermediate layer. For example, the system calls may be redirected from the data in the library of data to the intermediate layer.

The system calls may optionally be intercepted by linking the intermediate layer to the application. For example, the intermediate layer may be linked to the application during compilation of the application. In this way, the intermediate layer may be utilized to automatically intercept the system calls via the linking of the intermediate layer to the application, and thus without requiring code within the application to be modified prior to compilation thereof. With respect to the present description, the interception of the system calls may include any redirection of the system calls from the library of data to the intermediate layer, such that the system calls are prevented from being received by the library of data from the application.

In one embodiment, only a subset of the system calls may be intercepted by the intermediate layer. Such subset of system calls may be predetermined. Just by way of example, only predetermined types of system calls may be intercepted by the intermediate layer. As another example, the subset of system calls may include system calls predetermined to at least potentially be associated with (e.g. utilized for initiating, etc.) unwanted activity, such as malware.

In another embodiment, the system calls may be intercepted before any portion of the system call is completed. Just by way of example, an open file system call may be intercepted prior to the file being opened via the open file system call. In yet another embodiment, the system calls may be intercepted after at least a portion of the system call is completed. For example, a write file system call may include a command to open a file, write to the file and close the file, such that the write file system call may be intercepted after the write to the file is completed but before the file is closed via the write file system call.

Still yet, the security action initiated on the data in response to the interception may include any action for securing the data. In various embodiments, the security action may include presenting a notification that the data include unwanted data (e.g. issuing an alert), blocking the system call, quarantining the data, etc. Of course, however, the security action may include any action initiated on the data in response to the interception for securing the data.

As an option, the security action may be initiated on the data based on a determination that the data includes unwanted data. Just by way of example, a security system may be operable to determine that the data includes the unwanted data (e.g. based on an analysis, scanning, etc. of the data). The security system may be included in the intermediate layer, in one embodiment.

In another embodiment, the security system may be in communication with (e.g. separate from) the intermediate layer. Thus, the intermediate layer may optionally be operable to communicate with the security system. For example, the intermediate layer may be operable to send a request to the security system for requesting an analysis of the data by the security system. The intermediate layer may further be operable to receive the determination that the data includes unwanted data from the security system based on the request, and accordingly initiate the security action on the data.

Still yet, it should be noted that the security action may be initiated in any desired manner. In one embodiment, the intermediate layer may perform the security action. In another embodiment, a user interface application may be operable to communicate with the intermediate layer, such that the intermediate layer may send a request for the user interface application to perform the security action.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
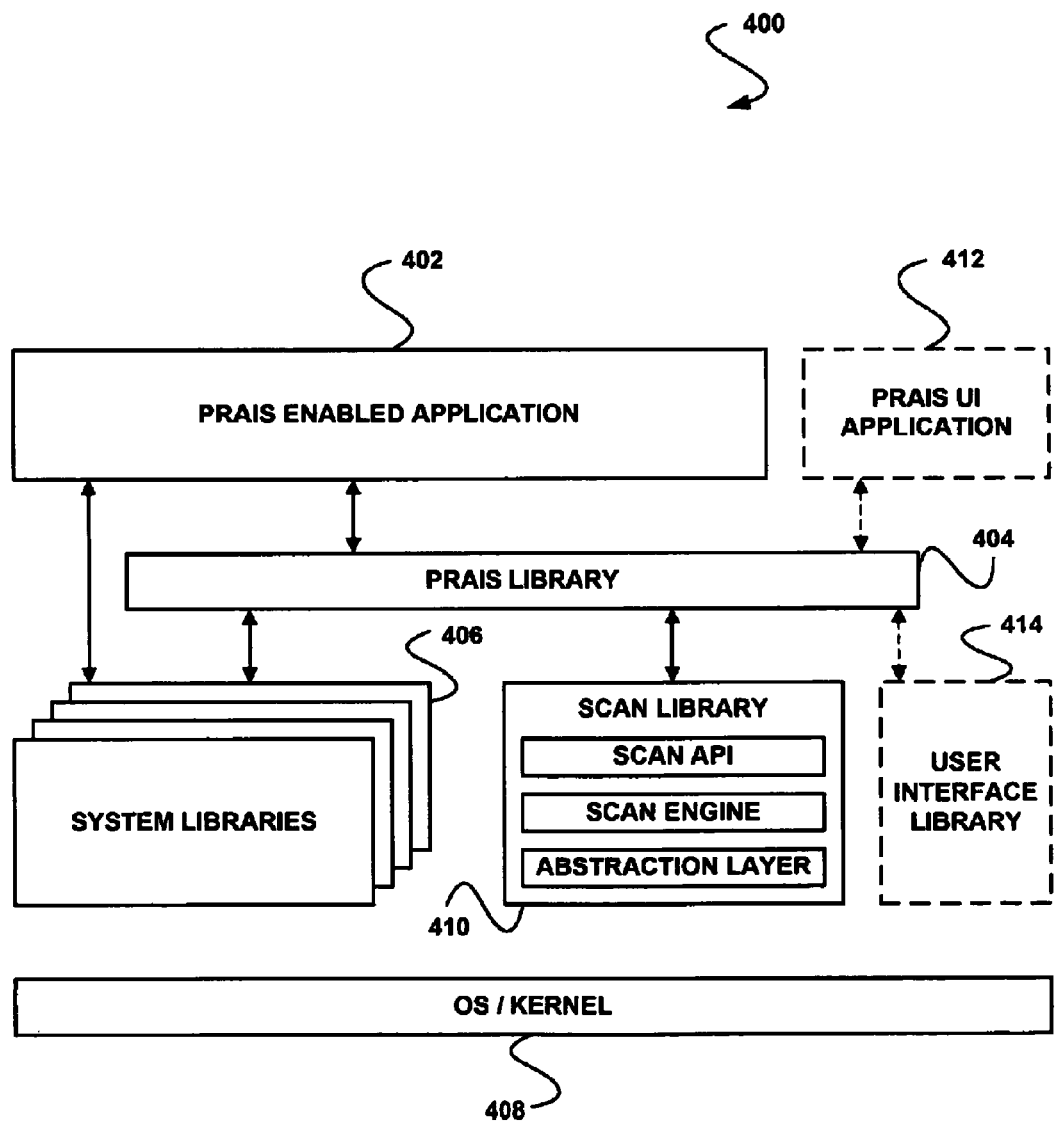
FIG. 4 shows a system for initiating a security action at an intermediate layer coupled between a library and an application, in accordance with another embodiment.

FIG. 4 shows a system 400 for initiating a security action at an intermediate layer coupled between a library and an application, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a platform resource access interception scanning (PRAIS) enabled application 402 is in communication with a PRAIS library 404. The PRAIS enabled application 402 may include any application that is linked to the PRAIS library 404 during compilation thereof. Additionally, the PRAIS library 404 may include any intermediate layer coupled between the PRAIS enabled application 402 and at least one system library 406 that is capable of intercepting system calls to the system library 406 that are produced by the PRAIS enabled application 402.

To this end, in response to performance of a system call to a system library 406 by the PRAIS enabled application 402, the PRAIS library 404 may intercept such system call. Thus, by intercepting system calls via the PRAIS library 404, the system calls may be intercepted above an operating system kernel layer 408. For example, the system calls may be intercepted at an application layer of a system (e.g. device, etc.) on which the application is installed.

As an option, the PRAIS library 404 may only intercept a subset of all system calls made by the PRAIS enabled application 402. For example, the PRAIS library 404 may only intercept predetermined types of system calls (e.g. calls to a registry, etc.) made by the PRAIS enabled application 402. Such predetermined types of system calls may include system calls predetermined to be at least potentially associated with unwanted activity. In this way, if a system call made by the PRAIS enabled application 402 is not included in the predetermined types of system calls, the system call may not be intercepted by the PRAIS library 404, and may thus be directly communicated to the system library 406 to which such system call is destined.

It should be noted that the system calls produced by the PRAIS enabled application 402 may be intercepted at any desired point in the execution thereof. Table 1 illustrates various examples of points within the execution of system call during which such system calls may be intercepted. It should be noted that the examples presented in Table 1 are set forth for illustrative purposes only, and thus should not be construed as limiting in any manner.

TABLE 1

| SYSTEM CALL | POINT OF INTERCEPTION |
| --- | --- |
| Read Open | Before file open process is completed |
| Write Close | After file close is completed and before file close is returned |
| File Copy | Before file copy function is performed |
| File Rename | Before file rename function is performed |
| File Move | Before file move operation is performed |

Upon interception of a system call by the PRAIS library 404, the PRAIS library 404 sends a request to a scan library 410 for the data in the system library 406 targeted (e.g. attempted to be operated on, etc.) by the system call to be scanned. The scan library 410 may include any security system capable of scanning the data for unwanted. While the scan library 410 is shown separate from the PRAIS library 404, it should be noted that the scan library 410 may also be included in the PRAIS library 404, as another option.

In one embodiment, the request from the PRAIS library 404 may be received by a scan application program interface (API) utilized for invoking functionality of the scan library 410. For example, the scan API may invoke a scan engine of the scan library 410 for scanning the data. An abstraction layer of the scan library 410 may optionally be utilized for performing an abstraction of the data prior to scanning of the data by the scan engine.

Accordingly, the scan library 410 may determine whether the data attempted to be operated on by the system call includes unwanted data. A result of such determination may be communicated from the scan library 410 to the PRAIS library 404. Based on the result, the PRAIS library 404 initiates a security action on the data. As an option, the PRAIS library 404 may allow the system call to be completed if the result received from the scan library 410 indicates that the data does not include unwanted data. For example, the PRAIS library 404 may allow the system call to be completed by performing the system call (e.g. by initiating the system call to the system library 406 at the PRAIS library 404). Further, a result of the system call may be returned from the PRAIS library 404 to the PRAIS enabled application 402.

As another option, the PRAIS library 404 may initiate the security action if the result received from the scan library 410 indicates that the data includes unwanted data. In one embodiment, the security action may include preventing the system call from being completed. For example, the PRAIS library 404 may not initiate the system call to the system library 406. In another embodiment, the security action may include returning an error to the PRAIS enabled application 402 in response to the invocation of the system call by the PRAIS enabled application 402.

In another embodiment, the security action may include presenting a notification (e.g. alert) of the presence of the unwanted data in the data attempted to be accessed by the system call. For example, such notification may be presented to a user of the system on which the PRAIS enabled application 402 is installed. As an option, the PRAIS library 404 may be in communication with a PRAIS user interface (UI) application 412, which may present the notification (e.g. via a pop-up window, etc.). As another option, the PRAIS UI application 412 may utilize a user interface library 414 to identify the notification to be presented.

Table 2 illustrates various examples of security actions that may be performed based on the result of the determination of whether the data attempted to be operated on by the system call includes unwanted data, when the system call is intercepted before execution of the system call. As shown, the security actions may optionally be based on a level of malware detected. Such level may be associated with a severity of a type of malware detected, etc. It should be noted that the security actions are set forth for illustrative purposes only and thus should not be construed as limiting in any manner.

TABLE 2

| SCAN RESULT | SECURITY ACTION |
| --- | --- |
| No unwanted data detected | Invoke the system call originally invoked by the PRAIS enabled application and return a result of the invocation to the PRAIS enabled application |
| Detected level 0 of malware | Initiate notification of detection to user interface, Invoke the system call originally invoked by the PRAIS enabled application and return a result of the invocation to the PRAIS enabled application |
| Detected level 1 or 2 of malware | Initiate notification of detection to user interface, Return error to PRAIS enabled application |
| Detected level 3 or 4 of malware | Initiate notification of detection to user interface, Remove the data including the malware, Return error to PRAIS enabled application |

Figure 5:
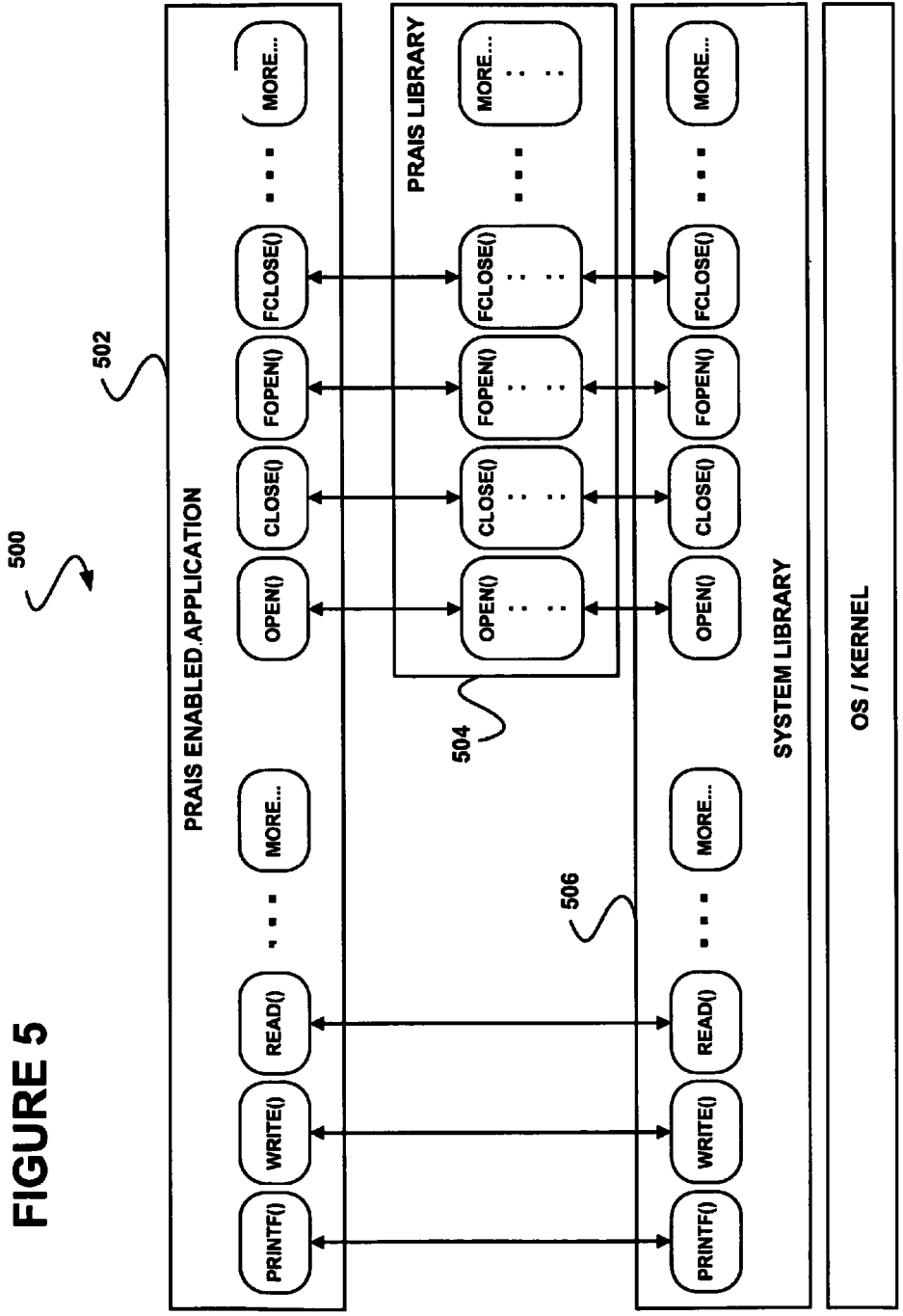
FIG. 5 shows a system for intercepting system calls at an intermediate layer coupled between a library and an application, in accordance with yet another embodiment.

FIG. 5 shows a system 500 for intercepting system calls at an intermediate layer coupled between a library and an application, in accordance with yet another embodiment. As an option, the system 500 may be implemented in the context of the architecture and environment of FIGS. 1-4. Of course, however, the system 500 may be implemented in any desired environment. Again, it should be noted that the aforementioned definitions may apply during the present description.

As shown, the PRAIS library 504 may intercept only a subset of system calls produced by the PRAIS enabled application 502. The subset of system calls intercepted may be based on predetermined types of system calls. In one embodiment, the PRAIS library 504 may be configured to intercept such predetermined types of system calls.

For example, as shown, the PRAIS library 504 may intercept an open system call, a close system call, a fopen (file open) system call, an fclose (file close) system call, etc. The PRAIS library 504 may also invoke the intercepted system calls with respect to a system library 506 originally targeted by the system calls prior to interception thereof. For example, the PRAIS library 504 may invoke the intercepted system calls based on a determination of whether the data in the targeted system library 506 includes unwanted data.

Further, the PRAIS library 504 may not intercept a printf (print file) system call, a write system call, a read system call, etc. The system calls not intercepted by the PRAIS library 504 may therefore by directly communicated from the PRAIS enabled application 502 to a system library 506 targeted by such system calls. While various types of system calls shown to be intercepted and not intercepted by the PRAIS library 504 are shown, it should be noted that any combination of different types of system calls may be intercepted by the PRAIS library 504.

Figure 6:
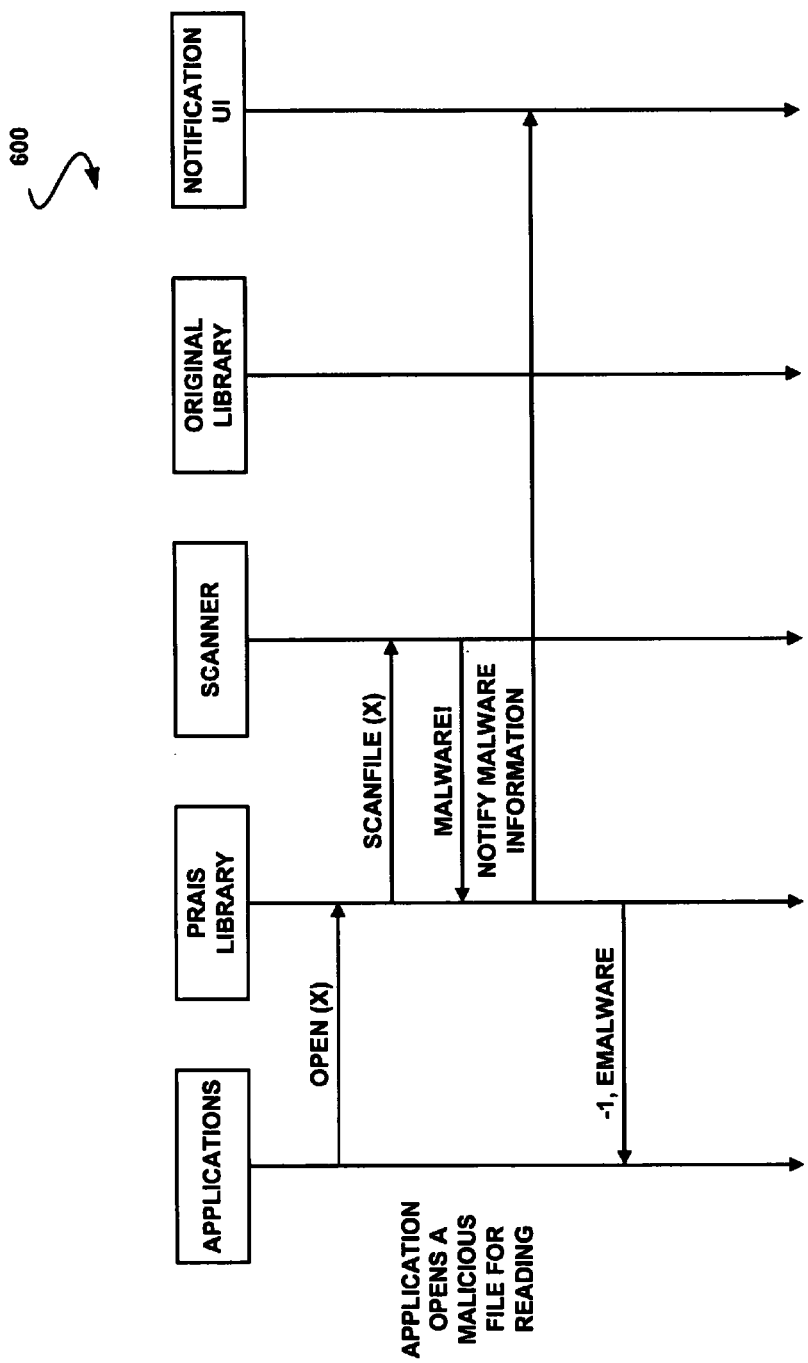
FIG. 6 shows a method for communicating a notification of malware detected based on a request to read a file, in accordance with still yet another embodiment.

FIG. 6 shows a method 600 for communicating a notification of malware detected based on a request to read a file, in accordance with still yet another embodiment. As an option, the method 600 may be implemented in the context of the architecture and environment of FIGS. 1-5. Of course, however, the method 600 may be implemented in any desired environment. Again, it should be noted that the aforementioned definitions may apply during the present description.

As shown, an application invokes a system call to open a malicious file (shown as file 'x') for reading. The malicious file may include malware, for example. The open system call is intercepted by a PRAIS library coupled between the application and the original library storing the malicious file.

In response to the interception, the PRAIS library sends a request to a scanner to scan the malicious file. The scanner accordingly determines that the malicious file includes malware, based on the scanning. A result of the scanning may therefore indicate that the malicious file includes malware.

The result is returned to the PRAIS library as a response to the request for the scan. The PRAIS library determines that the malicious file includes malware, utilizing the result. Further, the PRAIS library sends a request to a notification UI to present a notification of the malware to a user of the system on which the malicious file is located. In addition, the PRAIS library returns an error to the application as a response to the invocation of the system call. Further, the PRAIS library may not invoke the system call, such that the opening of the file based on the intercepted system call may be prevented.

Figure 7:
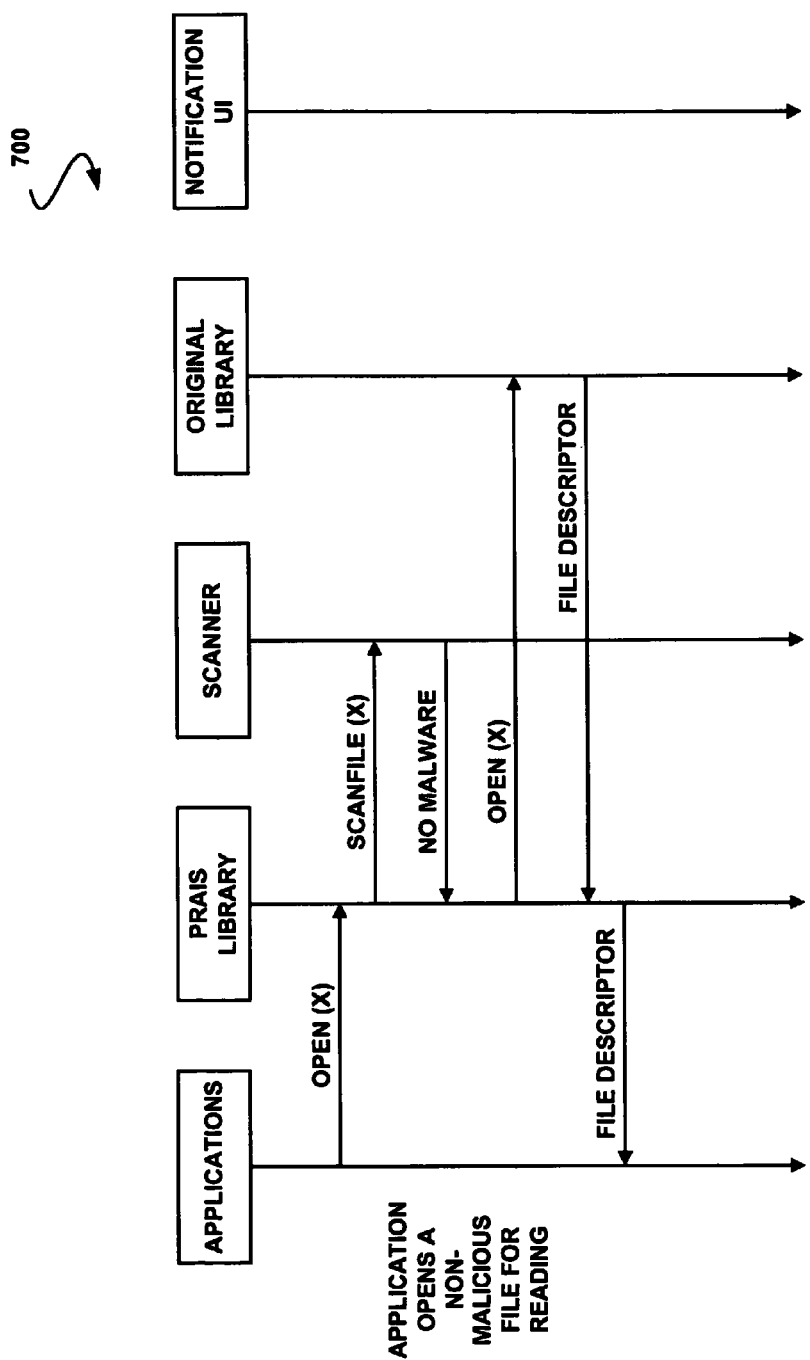
FIG. 7 shows a method for allowing a file to be read based on a determination that the file does not include malware, in accordance with another embodiment.

FIG. 7 shows a method 700 for allowing a file to be read based on a determination that the file does not include malware, in accordance with another embodiment. As an option, the method 700 may be implemented in the context of the architecture and environment of FIGS. 1-6. Of course, however, the method 700 may be implemented in any desired environment. Again, it should be noted that the aforementioned definitions may apply during the present description.

As shown, an application invokes a system call to open a non-malicious file (shown as file 'x') for reading. The non-malicious file may not include any malware, for example. The open system call is intercepted by a PRAIS library coupled between the application and the original library storing the non-malicious file.

In response to the interception, the PRAIS library sends a request to a scanner to scan the non-malicious file. The scanner accordingly determines that the non-malicious file does not include malware, based on the scanning. A result of the scanning may therefore indicate that the non-malicious file does not include malware.

The result is returned to the PRAIS library as a response to the request for the scan. The PRAIS library determines that the non-malicious file does not include malware, utilizing the result. Further, the PRAIS library invokes a system call to open the non-malicious file for reading. The system call is therefore communicated from the PRAIS library to the original library storing the non-malicious file.

As shown, a file descriptor is sent from the original library to the application via the PRAIS library, in response to the invocation of the system call by the PRAIS library. The file descriptor may include the contents of the file, for example. In this way, the non-malicious file may be allowed to be opened for reading purposes.

Figure 8:
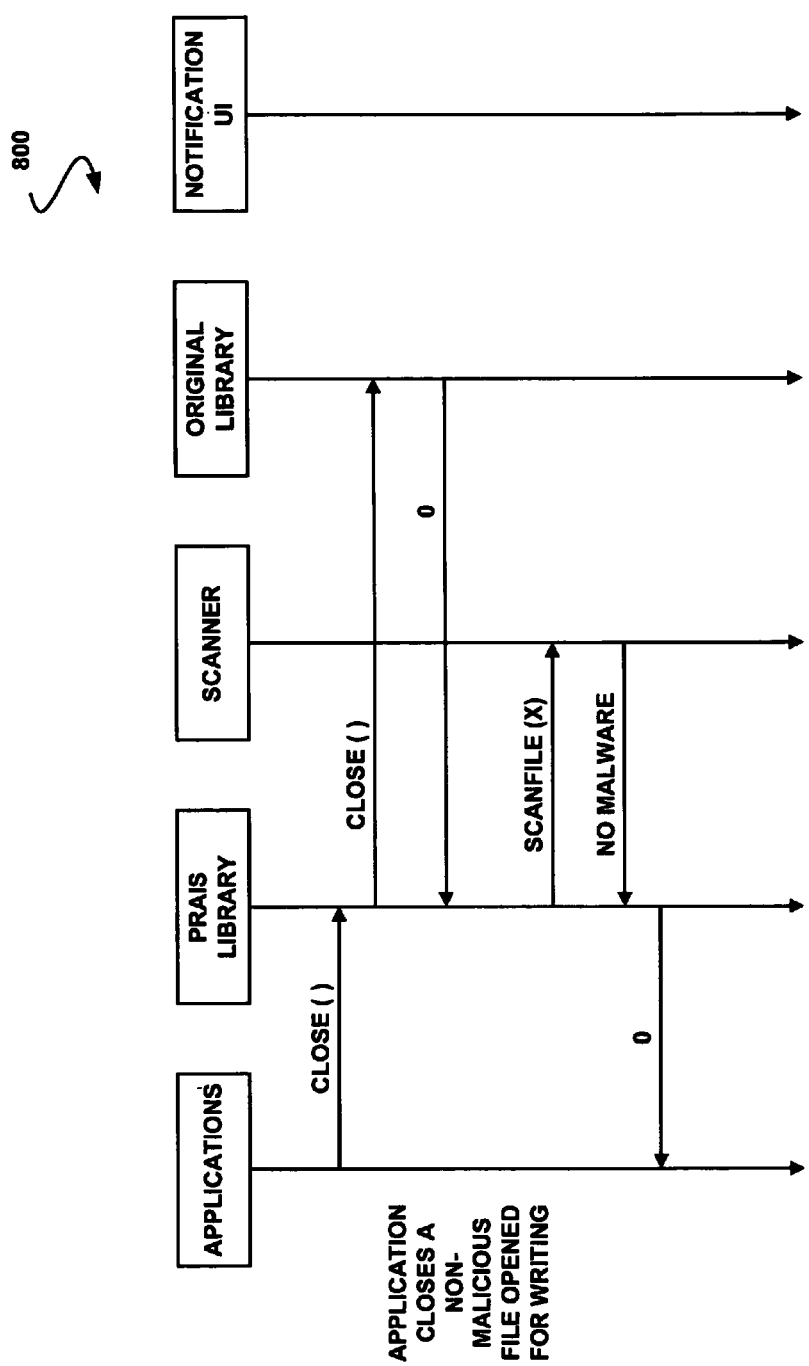
FIG. 8 shows a method for allowing a file to be closed in response to a write to the file based on a determination that the file does not include malware, in accordance with yet another embodiment.

FIG. 8 shows a method 800 for allowing a file to be closed in response to a write to the file based on a determination that the file does not include malware, in accordance with yet another embodiment. As an option, the method 800 may be implemented in the context of the architecture and environment of FIGS. 1-7. Of course, however; the method 800 may be implemented in any desired environment. Yet again, it should be noted that the aforementioned definitions may apply during the present description.

As shown, an application invokes a system call to close a non-malicious file (shown as file 'x') that was opened for writing purposes. The non-malicious file may not include any malware, for example. The close system call is intercepted by a PRAIS library coupled between the application and the original library storing the non-malicious file.

In response to the interception, the PRAIS library invokes the system call to close the non-malicious file. The system call is directed from the PRAIS library to the original library in which the non-malicious file is stored, as shown. Accordingly, the original library closes the non-malicious file, in response to the system call received from the PRAIS library.

Further, the original library may determine whether the closing of the non-malicious file results in an error. A result of determination is sent to the PRAIS library. As shown, the non-existence of the error is sent to the PRAIS library, with respect to the present embodiment.

Based on the receipt of the result of the determination by the original library (that an error is not associated with the close operation), the PRAIS library sends a request to a scanner to scan the non-malicious file. The scanner accordingly determines that the non-malicious file does not include malware, based on the scanning. A result of the scanning may therefore indicate that the non-malicious file does not include malware.

The result is returned to the PRAIS library as a response to the request for the scan. The PRAIS library determines that the non-malicious file does not include malware, utilizing the result. Further, the PRAIS library returns an indication to the application that the error is not associated with the system call to close the non-malicious file. In this way, the non-malicious file may be allowed to be closed after being written.

Figure 9:
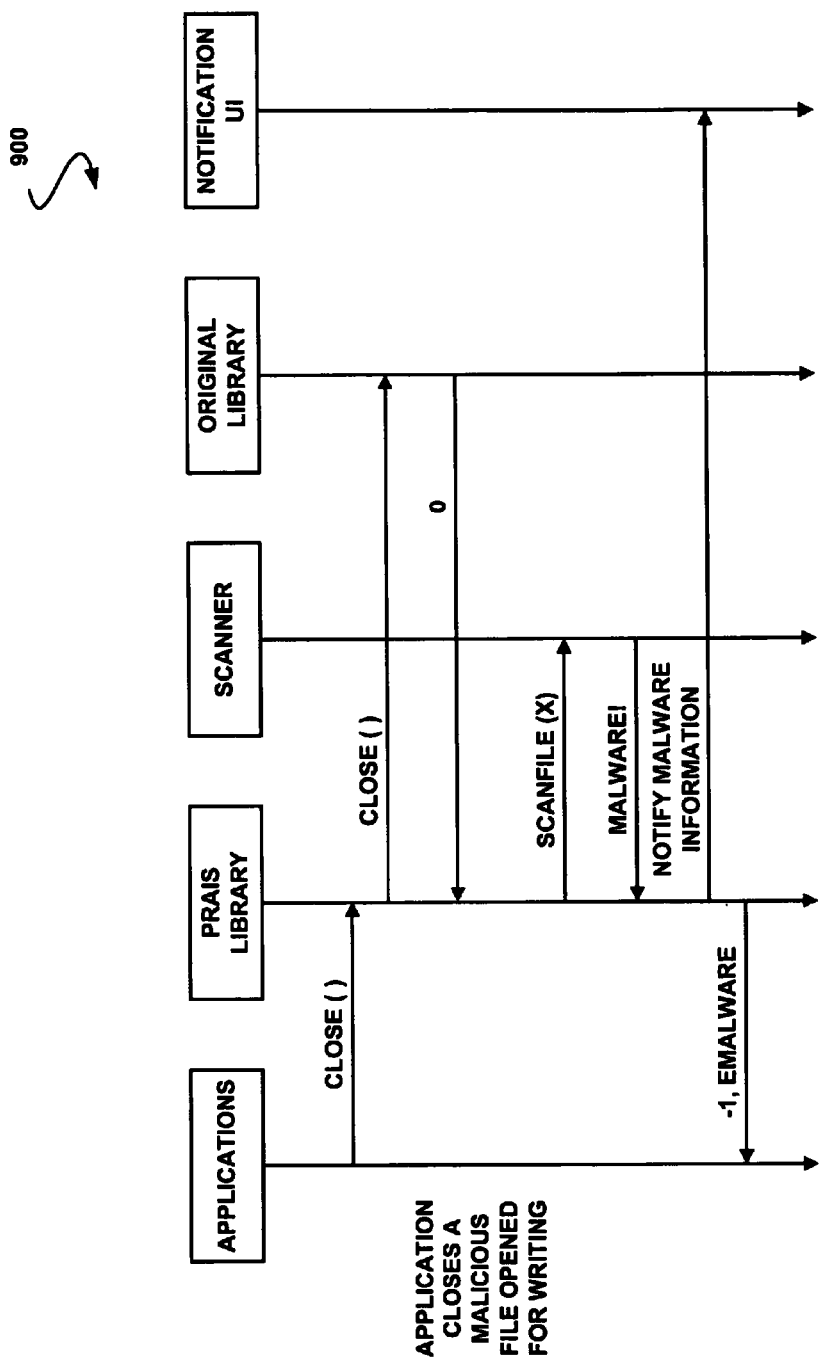
FIG. 9 shows a method for communicating a notification of malware detected based on a request to close a file to which a write has occurred, in accordance with still yet another embodiment.

FIG. 9 shows a method 900 for communicating a notification of malware detected based on a request to close a file to which a write has occurred, in accordance with still yet another embodiment. As an option, the method 900 may be implemented in the context of the architecture and environment of FIGS. 1-8. Of course, however, the method 900 may be implemented in any desired environment. Again, it should be noted that the aforementioned definitions may apply during the present description.

As shown, an application invokes a system call to close a malicious file (shown as file 'x') that was opened for writing purposes. The malicious file may include malware, for example. The close system call is intercepted by a PRAIS library coupled between the application and the original library storing the malicious file.

In response to the interception, the PRAIS library invokes the system call to close the malicious file. The system call is directed from the PRAIS library to the original library in which the malicious file is stored, as shown. Accordingly, the original library closes the malicious file, in response to the system call received from the PRAIS library.

Further, the original library may determine whether the closing of the malicious file results in an error. A result of determination is sent to the PRAIS library. As shown, the non-existence of the error is sent to the PRAIS library, with respect to the present embodiment.

Based on the receipt of the result of the determination by the original library (that an error is not associated with the close operation), the PRAIS library sends a request to a scanner to scan the malicious file. The scanner accordingly determines that the malicious file includes malware, based on the scanning. A result of the scanning may therefore indicate that the malicious file includes malware.

The result is returned to the PRAIS library as a response to the request for the scan. The PRAIS library determines that the malicious file includes malware, utilizing the result. Further, the PRAIS library sends a request to a notification UI to present a notification of the malware to a user of the system on which the malicious file is located. In addition, the PRAIS library returns an error to the application as a response to the invocation of the system call. Further, the PRAIS library may not invoke the system call, such that the closing of the file based on the intercepted system call may be prevented.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon to cause one or more processors to:
    intercept a system call initiated by an application, the system call intended for operating on a piece of data in a library of data and intercepted at an intermediate layer between the library of data and the application;
    send a request from the intermediate layer to a scanner to analyze the piece of data to determine if the piece of data includes unwanted data;
    receive a response from the scanner, the response received at the intermediate layer and comprising both an indication that the piece of data includes unwanted data and an indication of a severity level of the unwanted data;
    provide a user interface operable to communicate directly with the intermediate layer; and
    initiate a security action selected from a plurality of security actions, the selection based on the severity level of the unwanted data,
    wherein control is returned from the intercepted system call to the application for all severity levels.

2. The non-transitory computer readable medium of claim 1, wherein the library of data includes a system library.

3. The non-transitory computer readable medium of claim 1, wherein the library of data includes data files.

4. The non-transitory computer readable medium of claim 1, wherein the library of data includes a registry.

5. The non-transitory computer readable medium of claim 1, wherein the system call includes an input/output call.

6. The non-transitory computer readable medium of claim 1, wherein the system call includes one of open file, close file, read file, and write file system calls.

7. The non-transitory computer readable medium of claim 1, wherein the instructions to cause one or more processors to intercept the system call comprise instructions to cause the one or more processors to intercept only a subset of system calls initiated by the application.

8. The non-transitory computer readable medium of claim 7, wherein the subset of system calls is predetermined.

9. The non-transitory computer readable medium of claim 7, wherein the subset of system calls includes types of system calls predetermined to at least potentially be associated with unwanted activity.

10. The non-transitory computer readable medium of claim 1, wherein the instructions to cause one or more processors to initiate the security action comprise instructions to cause the one or more processors to send a request to the user interface to get an acknowledgement pertaining to performance of the security action.

11. The non-transitory computer readable medium of claim 10, wherein the security action includes presenting a notification indicating that the piece of data includes unwanted data, and wherein the security action includes presenting a notification indicating the severity level of the unwanted data.

12. A method, comprising:
    intercepting, by an intermediate layer, a system call generated by an application intended to operate on a piece of data in a library of data, wherein the intermediate layer is between the application and the library of data;
    sending a request from the intermediate layer to a security system to analyze the piece of data;
    analyzing, by the security system, the piece of data to determine if the piece of data includes unwanted data;
    determining, by the security system, a severity level of the unwanted data when the piece of data includes unwanted data;
    receiving a response at the intermediate layer from the security system, wherein the response comprises both an indication that the piece of data includes unwanted data and an indication of a severity level of the unwanted data;
    providing a user interface operable to communicate directly with the intermediate layer; and
    initiating, by the security system, a security action selected from a plurality of security actions, the selection based on the severity level of the unwanted data,
    wherein control is returned from the intercepted system call to the application for all severity levels.

13. The method of claim 12, wherein the security action includes presenting a notification indicating that the piece of data includes unwanted data, and wherein the security action includes presenting a notification indicating the severity level of the unwanted data.

14. A system, comprising:
    one or more hardware processors; and
    a memory communicatively coupled to the one or more hardware processors, wherein the memory stores instructions to cause the one or more processors to:
    intercept, by an intermediate layer, a system call generated by an application intended to operate on a piece of data in a library of data, wherein the intermediate layer is between the application and the library of data;
    send a request from the intermediate layer to a security system to analyze the piece of data;
    analyze, by the security system, the piece of data to determine if the piece of data includes unwanted data;
    determine, by the security system, a severity level of the unwanted data when the piece of data includes unwanted data;
    receive a response at the intermediate layer from the security system, wherein the response comprises both an indication that the piece of data includes unwanted data and an indication of a severity level of the unwanted data;

provide a user interface operable to communicate directly with the intermediate layer; and initiate a security action selected from a plurality of security actions, the selection based on the severity level of the unwanted data, wherein control is returned from the intercepted system call to the application for all severity levels.

15. The system of claim 14, wherein the security action includes presenting a notification indicating that the piece of data includes unwanted data, and wherein the security action includes presenting a notification indicating the severity level of the unwanted data.

16. The system of claim 14, wherein the instructions to cause the one or more processors to analyze the piece of data comprise instructions to cause the one or more processors to intercept the system call.

17. The system of claim 14, wherein the instructions to cause the one or more processors to initiate a security action include instructions to cause the one or more processors to initiate a security action based on the severity level of the unwanted data as determined by the instructions to cause the one or more processors to analyze the piece of data.

* * * * *